United States Patent [19]
Luke, Jr.

[11] Patent Number: 4,987,540
[45] Date of Patent: Jan. 22, 1991

[54] AUTOMATIC GUIDED VEHICLE SYSTEM HAVING COMMUNICATION AND TRAFFIC CONTROLLER WITH UNGUIDED PATHS

[75] Inventor: Walter Luke, Jr., Binghamton, N.Y.

[73] Assignee: WHS Robotics, Inc., Binghamton, N.Y.

[21] Appl. No.: 358,234

[22] Filed: May 30, 1989

[51] Int. Cl.$^5$ .............................................. G06F 15/48
[52] U.S. Cl. .............................. 364/424.02; 364/436; 318/587; 180/168
[58] Field of Search ....................... 364/424.01, 424.02, 364/436, 460, 461, 449, 443; 318/587; 180/167, 168, 169

[56] References Cited

U.S. PATENT DOCUMENTS

| | | | |
|---|---|---|---|
| 3,933,099 | 1/1976 | Reinhard | 180/167 |
| 4,284,160 | 8/1981 | DeLiban et al. | 318/587 |
| 4,530,056 | 7/1985 | MacKinnon et al. | 364/424.02 |
| 4,653,002 | 3/1987 | Barry | 364/424.02 |
| 4,669,047 | 5/1987 | Chucta | 364/424.02 |
| 4,716,530 | 12/1987 | Ogawa et al. | 364/424.02 |
| 4,727,492 | 2/1988 | Reeve et al. | 364/424.02 |
| 4,791,570 | 12/1988 | Sherman et al. | 364/424.02 |
| 4,956,777 | 9/1990 | Cearley et al. | 364/424.02 |

Primary Examiner—Parshotam S. Lall
Assistant Examiner—Michael Zanelli
Attorney, Agent, or Firm—Salzman & Levy

[57] ABSTRACT

A system for allowing an automatic guided vehicle (AGV) to move from a first guided area to a second guided area across an unguided span that separates them. A first guidance structure such as a buried cable is displaced from a second guidance structure. A communications and traffic controller is connected to each of the first and second guidance structures. Also connected to the communications and traffic controller is a transponder for signalling when an AGV is leaving the first guided area.

12 Claims, 7 Drawing Sheets

AUTOMATIC GUIDED VEHICLE SYSTEM HAVING COMMUNICATION AND TRAFFIC CONTROLLER WITH UNGUIDED PATHS

RELATED APPLICATIONS

This application is related to copending patent applications for "Automatic Guided Vehicle System" Ser. No. 07/313,654, for "Interactive Display for Use on an Automatic Guided Vehicle" Ser. No. 07/313,213, and for "Replaceable Vehicle Control PROM" Ser. No. 07/313,655, all filed on Feb. 17, 1989, and all of which applications are hereby incorporated by reference.

BACKGROUND OF THE INVENTION

The present invention relates to automatic guided vehicle (AGV) systems and, more particularly, to an AGV system having guided and unguided paths and in which communications data and vehicle guidance signals are transferred among AGVs and a communications and traffic controller.

In the field of material handling, most commonly in a warehouse environment, many articles must be stored in inventory and, an indefinite time later, retrieved for use. The larger the warehouse facility, the greater the number of objects that can be stored.

Moreover, large warehouse facilities require a great amount of geographical space. Not only are modern warehouses spread over an appreciable distance, but their height allows many objects to be stacked for storage one above the other. Each object location or bin can be identified along three axes: X, Y and Z. Thus, a warehouse location for any specified particular object can be uniquely identified.

When the warehouse is large, it becomes burdensome to move material from one part (e.g., the port of entry) to another part thereof (e.g., a storage bin). Moreover, certain warehouses house large objects, weighing many pounds or even tons. The combination of large objects to be stored in a warehouse and great distances between pickup and delivery (P & D) stands lends itself to assigning tasks to automatic guided vehicles. As used herein, the term "assignment" indicates an address of a P & D stand for a pickup or a delivery operation.

It has been found that guided vehicles moving over a buried inductive cable can perform many of the functions that humans perform without the requirements of lighting, heating, ventilation and air conditioning that would normally be mandatory for modern human working conditions. Moreover, AGVs can be relied upon to operate continuously 24 hours per day. These advantages of performance over human laborers result in greater efficiency for warehouse facilities.

In certain environments, it is impossible to provide a buried inductive cable at all locations over which an automatic guided vehicle is to travel. For example, it may be difficult or impossible to bury a cable between a plurality of buildings that form one warehouse facility. Other obstacles to burying cables may be metallic floors, nearly impermeable rock formations and the like.

When an AGV must travel over an unguided path (i.e., an area in which a buried cable is not present), prior systems have failed to control or even communicate with the AGVs, resulting, of course, in loss of overall system integrity.

For prior art systems in which communications and guidance information is constantly required, only closed loop systems with no interruption could be used, thus limiting an automated warehouse's usefulness.

Another general disadvantage of prior art systems is that, when they address the problem of communications at all, they create separate systems for communications with AGVs and for controlling traffic. It has been found that separate subsystems that communicate with AGVs and that manage or control traffic can cause unforeseen difficulties in overall warehouse management. For example, a communications signal that instructs an AGV to move in one direction may conflict directly with an instruction that would otherwise optimize traffic control. The result can be grid lock or other sorts of traffic jams and inefficiencies.

DISCUSSION OF RELATED ART

Generally speaking, there are presently two major types of automated guided vehicle system for warehouses:
  (a) a system featuring a buried wire in the floor of a warehouse, that guides the vehicle through given paths of the warehouse; and
  (b) a vehicle traveling on a warehouse path that is kept on track by optical (e.g., laser) reflective units positioned above ground along the guide path.

Both of the aforementioned systems have drawbacks that have been found to make the guidance of the vehicles unreliable.

U.S. Pat. No. 4,168,760; issued: Sept. 25, 1979, depicts a wire guidance system that makes decisions at vehicular intersections based upon comparison of destination addresses stored at the intersections, so that large quantities of data need not be stored in computer memory.

In U.S. Pat. No. 4,727,492; issued: Feb. 23, 1988, a system is disclosed for guiding a vehicle along a given route or pathway by storing data in the vehicle indicative of the path to be followed. The system also features a fixed target detection system utilizing a scanning laser.

In U.S. Pat. No. 4,791,570, issued: Dec. 13, 1988, a wire guided vehicle system is shown which features a computer that polls the status of each vehicle for the purpose of maintaining proper traffic flow.

In U.S. Pat. No. 4,790,402; issued: Dec. 13, 1988, a laser guided vehicular system is illustrated wherein laser beam reflectors are positioned along the guide path for routing the vehicle. Certain targets are bar coded to keep track of vehicle position. The system also features reflective microwave sensors for speed and distance control.

U.S. Pat. No. 4,361,202; issued: Nov. 30, 1982, describes a system utilizing a sonic or radar collision avoidance system and a wire guidance technique. Transponders buried in the roadway provide position and speed information.

In the U.S. Pat. No 4,215,759, issued: Aug. 5, 1980, a vehicle guide path system is featured wherein the vehicle is steered and guided by radio control stations along the pathway.

U.S. Pat. No. 4,322,670; issued: Mar. 30, 1982, teaches a guide wire vehicle tracking system with superimposed signals for negotiating curves.

While all of the above-identified systems function reasonably well, none has been found to be completely reliable, especially when the AGVs must negotiate unguided paths. Nor do any of the aforementioned prior art systems combine communications data and vehicle guidance signals, so that system efficiency is substantially less than optimum.

It would be advantageous to provide a system for allowing an AGV to move from a first guided area to a second guided area across and an unguided span that separates them.

It would also be advantageous to provide a system in which a signal is generated when an AGV is about to leave the first guided area.

It would also be advantageous to provide a system that would generate a signal when the AGV enters the second guided area.

It would also be advantageous to provide a redundancy signal when the AGV is leaving the first guided area.

It would also be advantageous to provide communications data and vehicle guidance signals over a vehicle guidance structure, such as a buried cable.

It would also be advantageous to provide a communications and traffic control device connected to each of the guided areas.

It would also be advantageous to allow the communications data ultimately to control traffic.

It would also be advantageous to provide a mechanisms by which the communications and traffic control device can signal an AGV to perform a predetermined function.

It would also be advantageous to provide a system for facilitating communications to and from an AGV in accordance with a predetermined protocol.

SUMMARY OF THE INVENTION

In accordance with the present invention there is provided a system for allowing an AGV to move from a first guided area to a second guided area across an unguided span that separates them. A first guidance structure such as a buried cable is displaced from a second guidance structure. A communications and traffic controller is connected to each of the first and second guidance structures. Also connected to the communications and traffic controller is a transponder for signalling when an AGV is leaving the first guided area.

Moreover, the guidance structures are adapted to carry both communications data and vehicle guidance signals. The communications data that is transferred between an AGV and the communications and traffic controller can include information to facilitate traffic control as well as information for signalling the AGV to perform one or more predetermined functions.

BRIEF DESCRIPTION OF THE DRAWINGS

A complete understanding of the present invention may be obtained by reference to the accompanying drawings, when taken in conjunction with the detailed description thereof and in which.

DESCRIPTION OF THE PREFERRED EMBODIMENT

For purposes of clarity, like components will have the same numerical designation throughout the FIGURES.

Figure 1:
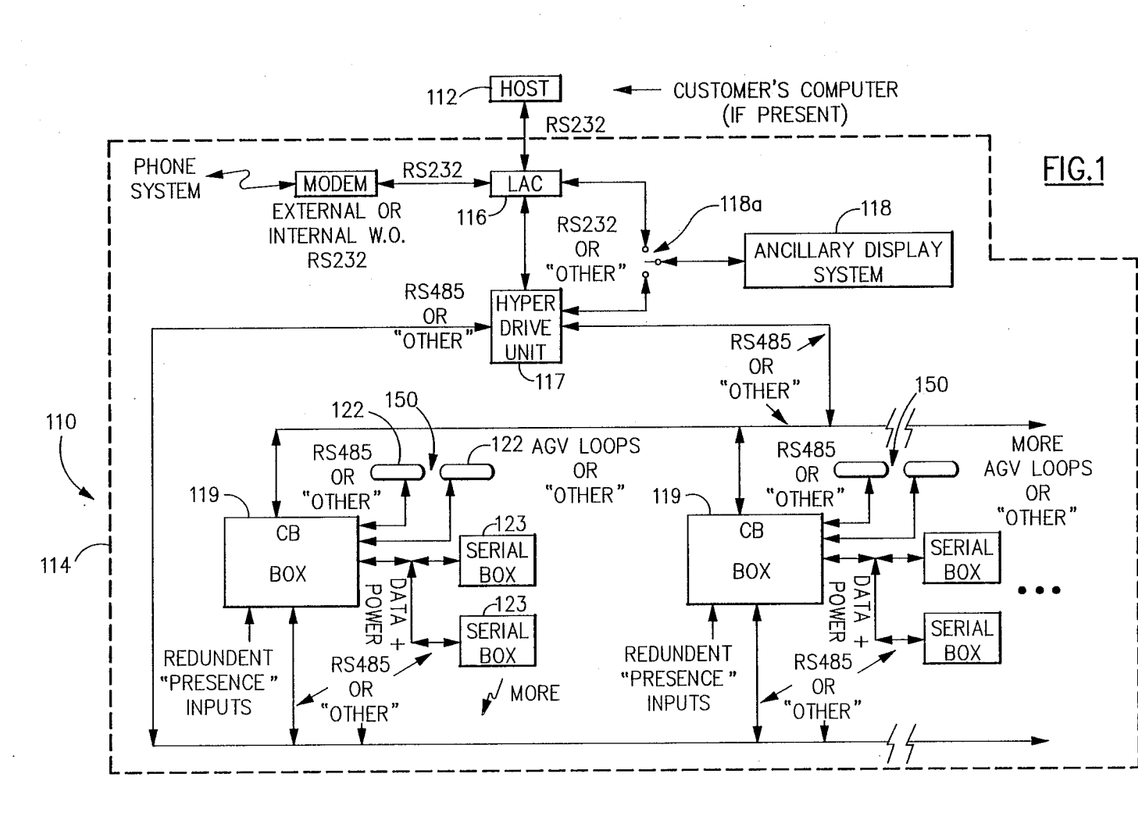
FIG. 1 is a block diagram of an automatic guided vehicle (AGV) system.

Referring now to FIG. 1, the system of the present invention and a host computer are shown generally at reference numeral 110. A host computer 112, such as a Tandem mainframe computer, provides a customer interface to the automatic guidance vehicle system (AGVS) 114 of the present invention.

A local area controller (LAC) 116, having a microprocessor (not shown) embedded therein provides the interface to host computer 112. LAC 116 is a computer such as that manufactured by the AST Corporation based on a Model No. 80286 microprocessor manufactured by Intel Corporation.

Connected to LAC 116 is a hyper driver (HD) 117, which is programmed to control and pass communications information among a plurality of communications and traffic control boxes (CBs) 119, each of which is programmed to communicate with and control the movement of one or more AGVs, not shown. Two CBs are shown in this FIGURE. Up to fifteen CBs 119 can be configured in one system 114. HD 117 is programmed for passing communications information between LAC 116 and all CBs 119.

Communications data represents information for controlling AGV movement at intersections of a guide path 122 and at P & D zone clusters and for conveying P & D information such as destination, load identification and travel path or route. Communications data can also be used to instruct AGVs to perform certain functions, including P & D maneuvers, and to travel to special maintenance areas. In addition, communications data may include status of AGVs relayed to suitable control centers.

Traffic control for each CB 119 occurs within a predetermined jurisdiction or guided area 150 of the guide path 122. Traffic control prevents collision of AGVs with one another and optimizes the flow of vehicles from their respective entry positions or current locations to their respective destinations in the system. In addition, CBs 119 are programmed to control and/or interrogate the status of a plurality of serial boxes (SBs) 123, each of which is used for controlling discrete devices, as in a P & D stand switch, an electric door, a light switch or the like. Connected to each SB 123 are up to two P & D stand switches, a warehouse bay door, a light, or any other discrete device that can provide a two bit input to SB 123 and can be controlled by a single bit output.

Connected to CB 119 is an inductive communication device, used for passing communication information between CB 119 and any one of the AGVs, not shown. Communication information is inductively passed through guide path 122 to AGVs.

Each CB 119 controls its own discrete guide path 122 including any of the subsystems of the AGV system 114, such as P & D stand clusters (not shown), SBs 123, intersections, home positions, battery charge areas, maintenance areas, and AGVs, the totality being referred to as a CB guided area 150.

Also connected to LAC 116 and/or HD 117 is an ancillary display system 118. Ancillary display system 118 can display status of the system and of the AGVs travelling therein. Ancillary display system 118 can drive a large screen CRT display monitor, a series of monitors, a projection video subsystem, process control floor map or the like, depending upon the particular applications and environment in which the inventive system finds use. A switch 118a allows ancillary display system 118 to display information generated by LAC 116 or status generated by HD 117, as appropriate. The structure of ancillary display system 118 is described in greater detail hereinbelow.

A guide wire communications network 122 is laid out in a facility beneath the surface of the warehouse floor, not shown. At various stations along guide path 122 are areas for recharging the batteries of AGVs, areas for storing AGVs between assignments (a home or parking position) and areas for performing AGV maintenance.

The AGVs of the present invention are programmed to travel to battery charge areas when their battery voltage level reaches less than a predetermined level and are programmed to travel to maintenance areas in accordance with predetermined preventive maintenance schedules.

It should be understood that a plurality of intersections of guide wire paths 122 may occur in any given layout. Traffic control at an intersection is provided by a software program within CB 119.

One or more AGVs operate along guide wire 122 in a manner described in the aforementioned copending patent application, Ser. No. 07/313,213, and under direction of a vehicle control program resident in each AGV.

Figure 2:
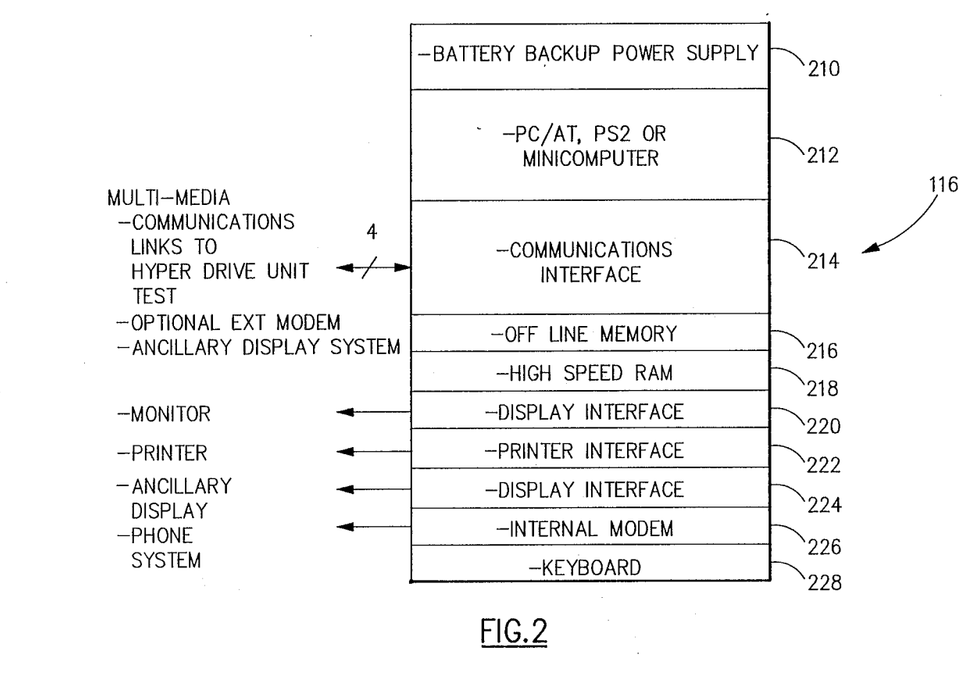
FIG. 2 is a block diagram of the local area controller of FIG. 1 shown in greater detail.

Referring now also to FIG. 2, there is shown a block diagram of local area controller (LAC) 116 of FIG. 1. A battery backup power supply 210 is used to ensure proper operation of the system in the event of main power supply failure. A processor 212, which can be any one of a number of micro or mini computers, such as IBM Model Nos. PC/AT, PS2 and the like, is used to control LAC 116. LAC processor 212 receives general directions from host 112 (FIG. 1) and assigns the task or tasks to one or more AGVs, not shown.

Connected to processor 212 is a communications interface 214 which, in turn, can include an embedded processor for communicating in accordance with a predetermined protocol, such as RS-232, RS-485, optical protocol or any other communications system standard protocol.

LAC 116 also includes an off line memory 216, a high speed RAM 218, two display interfaces 220 and 224, the former used to display information on a standard monitor, not shown, and the latter used to display information on ancillary display system 118 (FIG. 1).

Moreover, a printer interface 222 can generate a signal to a printer, not shown. An internal modem 226 can generate and receive signals by way of a telephone line, as is well known in the art. Internal modem 226 is also used as a remote debugging facility so that status of the system or any vehicles thereon can be queried from a remote location and corrective action can be taken, if needed.

Finally, keyboard 228 can be used to input information to processor 212. When used in this mode, LAC 116 receives instructions from a human operator or other intelligent device, rather than host computer 112. Keyboard 228 can also be used to input information that complements instructions generated by host 112.

Figure 3:
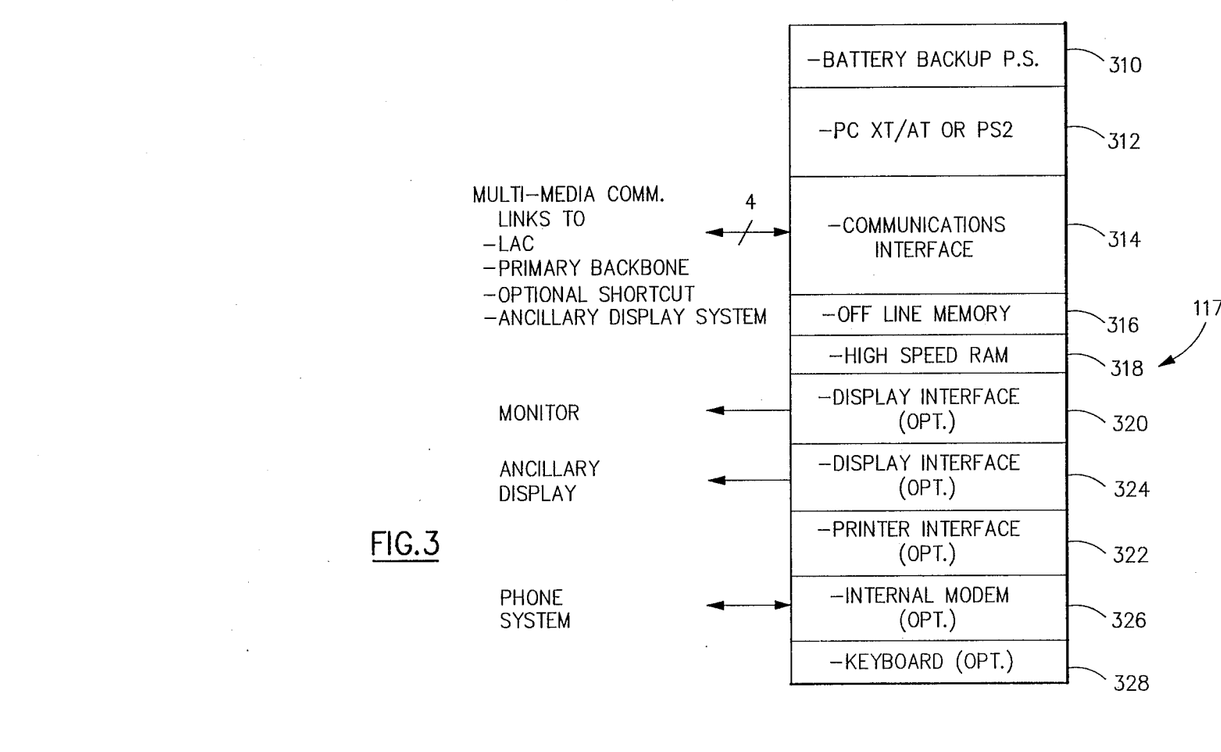
FIG. 3 is a block diagram of the hyper driver unit of FIG. 1 shown in greater detail.

Referring now also to FIG. 3, there is shown a block diagram of hyper driver (HD) 117 (FIG. 1). A battery backup power supply 310 is used to ensure proper operation of the system in the event of main power supply failure. A processor 312, which can be any one of a number of micro or mini computers, such as IBM Model Nos. PC/AT, PS2 and the like, is used to control HD 117. HD processor 312 receives general directions from LAC 116 (FIG. 1) and assigns the task or tasks to one or more AGVs, not shown.

Connected to processor 312 is a communications interface 314 which, in turn, can include an embedded processor for communicating in accordance with a predetermined protocol, such as RS-232, RS-485, optical protocol or any other communications system, standard protocol.

HD 117 also includes an off line memory 316, a high speed RAM 318, two display interfaces 320 and 324, the former used to display information on a standard monitor, not shown, and the latter used to display information on ancillary display system 118 (FIG. 1).

Moreover, a printer interface 322 can generate a signal to a printer, not shown. An internal modem 326 can generate and receive signals by way of a telephone line, as is well known in the art. Internal modem 326 is also used as a remote debugging facility so that status of the system or any vehicles thereon can be queried from a remote location and corrective action can be taken, if needed.

Finally, keyboard 328 can be used to input information to processor 312. When used in this mode, HD 117 receives instructions from a human operator or other intelligent device, rather than host computer 112. Keyboard 328 can also be used to input information that complements instructions generated by host 112.

Figure 4:
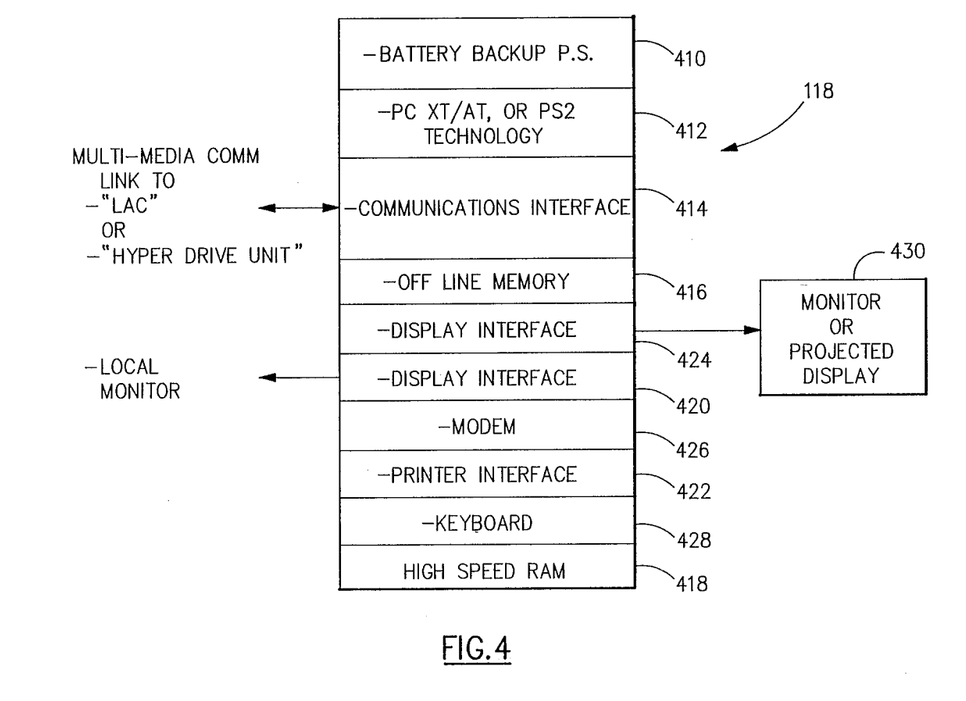
FIG. 4 is a block diagram of an ancillary display system of FIG. 1 shown in greater detail.

Referring now also to FIG. 4, there is shown a block diagram of ancillary display system 118 (FIG. 1). A battery backup power supply 410 is used to ensure proper operation of the system in the event of main power supply failure. A processor 412, which can be any one of a number of micro or mini computers, such as IBM Model Nos. PC/AT, PS2 and the like, is used to control system 118. Ancillary display system processor 412 receives general directions from the LAC 116 or HD 117 (FIG. 1).

Connected to processor 412 is a communications interface 414 which, in turn, can include an embedded processor for communicating in accordance with a predetermined protocol, such as RS-232, RS-485, optical protocol or any other communications system, standard protocol.

Ancillary display system 118 also includes an off line memory 416, a high speed RAM 418, a display interface 420 used to display information on a standard monitor, not shown, and a display interface 424 for driving large screen monitor 430, projection video subsystem or the like.

Moreover, a printer interface 422 can generate a signal to a printer, not shown. An internal modem 426 can generate and receive signals by way of a telephone line, as is well known in the art. Internal modem 426 is also used as a remote debugging facility so that status of the system or any vehicles thereon can be queried from a remote location and corrective action can be taken, if need.

Finally, keyboard 428 can be used to input information to processor 412. When used in this mode, system 118 receives instructions from a human operator or other intelligent device, rather than host computer 112. Keyboard 428 can also be used to input information that compliments instructions generated by host 112.

Figure 5:
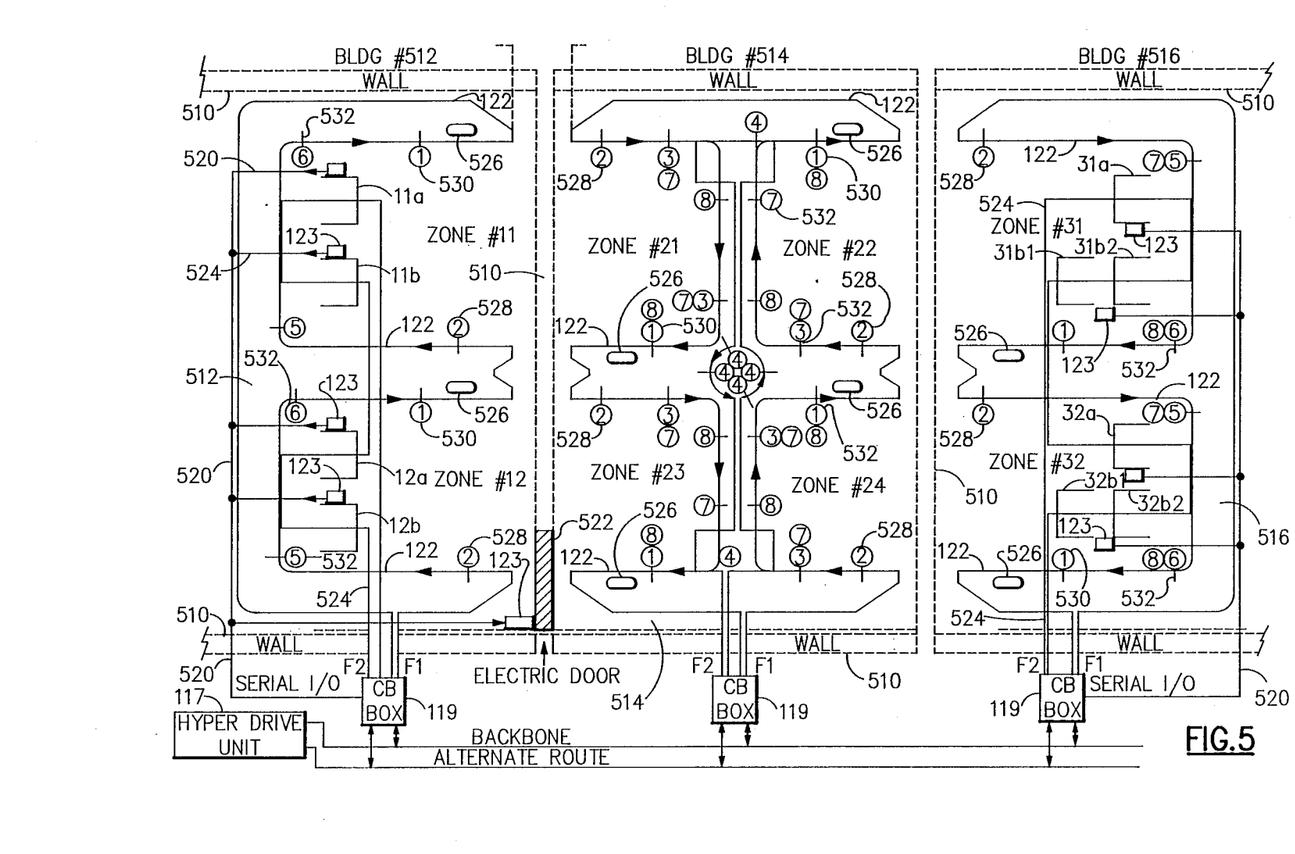
FIG. 5 is a wiring layout of an exemplary floor plan including a plurality of communications and traffic control boxes in accordance with the present invention.

Referring now also to FIG. 5, there is shown a wiring layout of an exemplary floor plan in accordance with the present invention.

In the floor plan depicted in FIG. 5, walls are shown in phantom and identified as reference numeral 510. Interior walls 510 separate buildings of a warehouse facility. The buildings are arbitrarily divided into two or four arbitrarily numbered, logical zones in the preferred embodiment, but other zone configurations and zone numbering systems can, of course, also be used without departing from the scope of the present invention.

Building 512 is partitioned into logical zones 11 and 12; building 514 is partitioned into zones 21–24; and building 516 is partitioned into zones 31 and 32.

Each zone may contain any number of P & D stands accessible by an AGV, not shown, travelling along guide path 122. Moreover, a specified zone (e.g., zone 23) may contain no P & D stands. Zone 11 has two P & D stands identified as reference numerals 11a and 11b. Zone 31 has two P & D stands identified as reference numerals 31a (a conventional one-position P & D stand) and 31b1 and 31b2 (a two-position P & D stand).

Associated with each P & D stand is a serial box 123 for detecting the presence or absence of a load on the corresponding P & D stand. The load status of each P & D stand is communicated to the CB 119 responsible for controlling traffic and communications for the respective zone over serial I/O signal line 520. This P & D communications network ensures that an AGV does not attempt to deliver a load to a destination P & D stand that cannot accept it.

Serial I/O signal line 520, connected to CB 119, is also used to communicate with and/or activate other serial boxes 123 such as that associated with an electric door 522 or with other special purpose devices such as electric lights, audible signals, HVAC units or the like, not shown.

Guide path 122 has an electric cable buried in the warehouse floor in the preferred embodiment. Signals are inductively transferred between AGVs and control devices 119 and 117 by means of guide path cables having a carrier signal frequency F1. Another carrier signal frequency F2 can be used to transfer signals inductively from an off-path buried cable 524, which can facilitate traffic control near P & D stands and other geographic features located off guide path 122.

Also disposed in the warehouse floor are exit transponders 526 such as those manufactured by Namco, Inc. as Model No. SN 110-10000. Transponders 526 indicate to the AGV that it is leaving a given zone. The AGV communicate this to CB 119.

Similarly, entrance transponders 528 buried in the warehouse floor indicate when an AGV is entering a given zone or building.

Between an exit transponder 526 and its corresponding entrance transponder 528 is an unguided portion of the warehouse floor, forming an unguided path for AGVs travelling between zones or buildings. Once the speed and direction (steering) of an AGV is set, the AGV system 114 can be programmed to sense a signal generated by the AGV in response to an exit transponder 526 and to anticipate the arrival of the AGV at a destination entrance transponder 528 a predetermined time later, irrespective of an intervening unguided path. Typically, the unguided portion of the vehicle path is on the order of 8–18 inches (the thickness of a wall), but theoretically any distance can be negotiated without guidance as long as the aforementioned initial AGV parameters are controlled.

Also buried in the warehouse floor in guide path 122 near exit transponders 526 in the preferred embodiment are sensors, such as magnetic sensors 530, electrically connected to CB 119 for providing a redundant indication thereto that an AGV is leaving a zone or building.

Along guide path 122 at intersections and curves in the path 122 are decision sensors or transponders 532 for signalling an AGV that a change of direction or change in some other operating characteristic (e.g., speed, lights, horn) is appropriate.

From the foregoing description, it is clear that the communications network, including CB 119, guide path 122, serial boxes 123 and transducers and sensors 526, 528, 530, 532, allows the AGV system 114 to transfer both communications data (i.e., communications information and traffic control information) and vehicle guidance signals between AGVs in the system and control devices 117, 119. Moreover, one or more of a group of functions can be performed by AGVs in the system and initiated from remote locations. The aforementioned AGV functions can be initiated at predetermined times, calculated as a function of traffic conditions, among other conventional factors.

Figure 6:
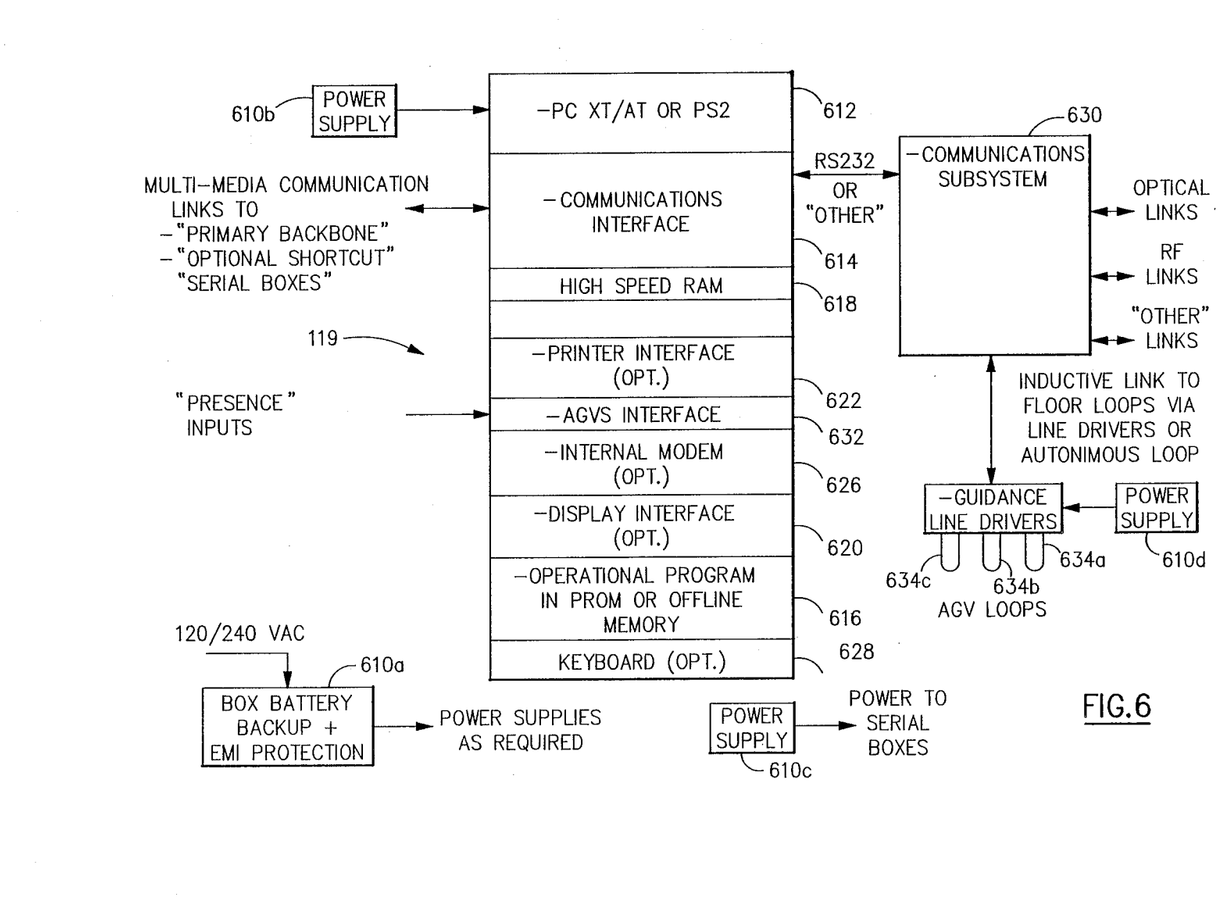
FIG. 6 is a block diagram of one of the communications and traffic control boxes of FIG. 5 shown in greater detail.

Referring now also to FIG. 6, there is shown a block diagram of a communications and traffic control box (CB) 119 (FIG. 1). A battery backup power supply 610 is used to ensure proper operation of the system in the event of main power supply failure. A processor 612, which can be any one of a number of micro or mini computers, such as IBM Model Nos. PC/AT, PS2 and the like, is used to control CB 119. CB processor 612 receives general directions from the HD 117 (FIG. 1) and assigns the task or tasks to one or more AGVs, not shown.

Connected to processor 612 is a communications interface 614 which, in turn, can include an embedded processor for communicating in accordance with a predetermined protocol, such as RS-232, RS-485, optical protocol or any other communications system, standard protocol.

CB 119 also includes an off line memory 616, a high speed RAM 618, and a display interface 620 to display information on a standard monitor, not shown.

Moreover, a printer interface 622 can generate a signal to a printer, not shown. An internal modem 626 can generate and receive signals by way of a telephone line, as is well known in the art. Internal modem 626 is also used as a remote debugging facility so that status of the system or any vehicles thereon can be queried from a remote location and corrective action can be taken, if needed.

Finally, keyboard 628 can be used to input information to processor 612. When used in this mode, CB 119 receives instructions from a human operator or other intelligent device, rather than host computer 112. Keyboard 628 can also be used to input information that complements instructions generated by host 112.

Power is distributed from the main power supply 610a to each of the major components in communications and traffic control box 119.

An AGV system interface 632 is provided to receive input from presence sensors, not shown.

Connected to the processing and interface components 612-632 is an inductive communications device or communications subsystem 630. Communications subsystem 630 is connected to communications interface 614 by means of an RS-232 or other protocol cable. Subsystem 630 provides links for radio frequency, optics or other suitable telecommunications media. Moreover, an inductive link, used in the preferred embodiment, allows communications subsystem 630 to communicate with a plurality of guidance line drivers 34a-634c. It should be understood that as part of the inductive link, autonomous loops can also be used. An autonomous loop has no functional relationship to the guide path apart from occupying the same floor cutting. Autonomous loops are provided for a special communications antenna, not shown, that may deviate from the guide path for "special" communications purposes. Up to eight guidance line driver loops 634 can be controlled by one communications and traffic control box 119, all powered by a power supply 610d.

Figures 7, 8:
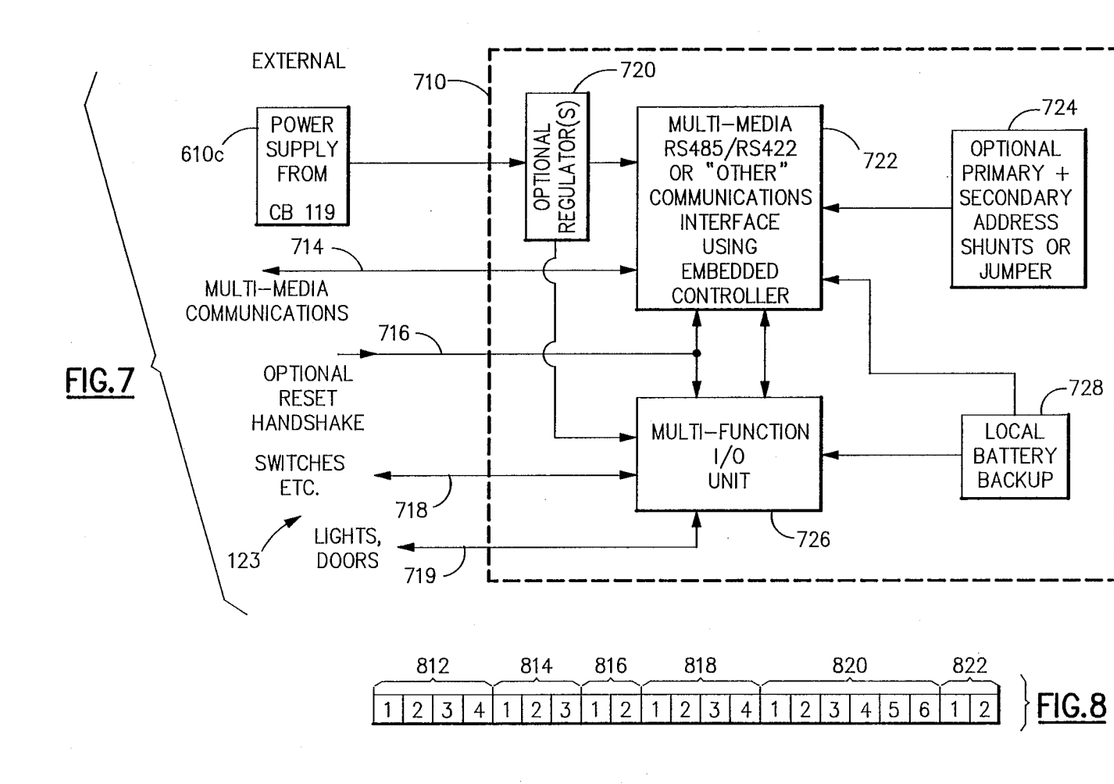
FIG. 7 is a block diagram of a serial card.
FIG. 8 is a diagram showing a typical transponder bit allocation in accordance with the present invention.

Referring now also to FIG. 7, there is shown a block diagram of a serial box (SB) 123 (FIG. 1). Within serial box 123 is disposed a printed circuit board or card 710.

Connected to serial card 710 are power supply 610c and a plurality of lines 714, 716, 718 and 719 for communicating with communications and traffic control boxes 119 and other components in the system.

A serial card 710 has four major components: power regulators 720, a communications interface 722, primary and secondary address shunts 724 and a multifunction I/O unit 726. Communications interface 722 includes an embedded controller for managing communications of serial card 710. In operation, a serial card 710 is placed at or proximate every P & D stand (e.g., reference numeral 11b (FIG. 5)) as well as near every electric door 532, light switch or other feature that can be operated by an AGV as it passes by the feature.

Local battery backup 728 is connected to multi-function I/O unit 726 and communications interface 722 to ensure proper, uninterrupted operation thereof in the event of catastrophic system power failure of power supply 610c.

Referring now also to FIG. 8, there is shown an exemplary format of a typical transponder 532 (FIG. 5) having a plurality of fields. Depending on the function that a transponder 526-532 is to perform, the layout of its fields and lengths thereof may vary. The first field 812 of transponder 532 is a 4-bit field for identifying special functions such as AGV speed, predetermined maneuvers, and the like. The second field 814 has three bits for identifying intersections and facilitating path finding. The third field 816 has two bits for initializing the system. The fourth field 818 has four bits for designating an address. The fifth field 820 has six bits for designating particular maneuvers based on traffic, such as whether to continue in a certain direction or change direction. The sixth field 822 has two bits to store bias information, such as a hysteresis field, grading or the transponder format itself.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A system for allowing an automatic guided vehicle (AGV) to move from a first guided area to a second guided area across an unguided span therebetween, comprising:
    (a) a first guidance means associated with a first guided area;
    (b) a second guidance means associated with a second guided area, said second guidance means being displaced a predetermined distance from said first guidance means, said predetermined distance defining an unguided span;
    (c) at least one communications and traffic control means including a high speed communications processor means operatively connected to each of said first and second guidance means for facilitating communications between said first and second guidance means in accordance with a predetermined protocol;
    (d) means operatively connected to said communications and traffic control means for signalling when an AGV is leaving said first guided area;
    (e) means operatively connected to said communications and traffic control means for signalling when an AGV is entering said second guided area;
    (f) master control means operatively connected to at least one of said communications and traffic control means for facilitating communications between a plurality of communications and traffic control means; and
    (g) a local area controller operatively connected to said master control means, said master control means facilitating communications between said local area controller and said at least one of said communications and traffic control means.

2. The system in accordance with claim 1, further comprising a serial communications bus connected between said at least one communications and traffic control means and said first and second guidance means, and wherein said predetermined protocol is accomplished by means of said serial communications bus protocol.

3. The system in accordance with claim 1 wherein said first guidance means and said second guidance means comprise electrical wires.

4. The system in accordance with claim 1 wherein said first guidance means and said second guidance means define a travel path for said AGV and said AGV travel path further comprises said unguided span.

5. The system in accordance with claim 4 wherein said first guided area and said guided area are disposed, respectively, in a first and in a second building.

6. The system in accordance with claim 1, wherein said master control means comprises a high speed communications processor means for facilitating communications in accordance with a predetermined protocol.

7. The system in accordance with claim 1, further comprising:
    an ancillary display means operatively connected to said master control means for displaying system status.

8. The system in accordance with claim 7 wherein said ancillary display means comprises a high speed communications processor means for facilitating communications in accordance with a predetermined protocol.

9. The system in accordance with claim 1, wherein said local area controller comprises a high speed communications processor means for facilitating communications in accordance with a predetermined protocol.

10. The system in accordance with claim 9, further comprising:
   ancillary display means operatively connected to said local area controller for displaying system status.

11. The system in accordance with claim 10 wherein said ancillary display means comprises a high speed communications processor means for facilitating communications in accordance with a predetermined protocol.

12. A system for allowing an automatic guided vehicle (AGV) to move from a first guided area to a second guided area across an unguided span therebetween, comprising:
   (a) a first guided area controller associated with a first guided area;
   (b) a second guided area controller associated with a second guided area, said second guided area controller being displaced a predetermined distance from said first guided area controller, said predetermined distance defining an unguided span;
   (c) communications and traffic control means operatively connected to each of said first and second guided area controllers;
   (d) a transponder operatively connected to said communications and traffic control means for signalling when an AGV is leaving said first guided area;
   (e) means operatively connected to said communications and traffic control means for signalling when said AGV is entering said second guided area; and
   (f) presence sensing means operatively connected to said communications and traffic control means for providing a redundant indicating signal when said AGV is leaving said first guided area.

* * * * *